United States Patent
Adam et al.

(10) Patent No.: US 6,212,821 B1
(45) Date of Patent: Apr. 10, 2001

(54) AUTOMATIC PLANT SELECTOR

(76) Inventors: Kieran L. Adam, 316 E. Mariposa Way, Santa Maria, CA (US) 93454; Dominic L. Adam, 1595 Oak Knoll, Santa Maria, CA (US) 93455

( * ) Notice: Subject to any disclaimer, the term of this patent is extended or adjusted under 35 U.S.C. 154(b) by 0 days.

(21) Appl. No.: 09/309,384

(22) Filed: May 10, 1999

(51) Int. Cl.[7] .............................. A01C 11/00; A01C 11/02
(52) U.S. Cl. ........................................ 47/1.01 R; 111/100
(58) Field of Search ................................ 47/1.01 R, 901, 47/58; 111/100, 103, 104, 105

(56) References Cited

U.S. PATENT DOCUMENTS

| | | | |
|---|---|---|---|
| 2,333,945 | 11/1943 | Mast et al. | 111/3 |
| 3,446,164 | 5/1969 | Huang et al. | 111/3 |
| 3,674,140 | * 7/1972 | File | 209/559 |
| 4,248,014 | 2/1981 | Williames | 47/86 |
| 4,290,373 | 9/1981 | Boots et al. | 111/3 |
| 4,307,827 | * 12/1981 | Turunen | 225/1 |
| 4,388,035 | 6/1983 | Cayton et al. | 414/417 |
| 4,408,549 | 10/1983 | Qvarnstrom | 111/2 |
| 4,616,578 | 10/1986 | Talbott | 111/2 |
| 4,644,880 | 2/1987 | Branch | 111/3 |
| 4,750,439 | 6/1988 | deGroot | 111/3 |
| 4,893,571 | 1/1990 | Hakli et al. | 11/105 |
| 4,947,579 | * 8/1990 | Harrison et al. | 47/1.01 R |
| 5,054,831 | * 10/1991 | Ting et al. | 294/61 |
| 5,215,550 | 6/1993 | Tesch, Jr. et al. | 47/1.01 R |
| 5,247,761 | 9/1993 | Miles et al. | 47/1.01 R |
| 5,257,889 | * 11/1993 | Suzuki et al. | 414/417 |
| 5,320,649 | * 6/1994 | Holland | 47/1.01 R |
| 5,365,693 | 11/1994 | Van Wingerden et al. | 47/1.01 R |
| 5,488,802 | * 2/1996 | Williames | 47/1.01 R |
| 5,557,881 | 9/1996 | Bouldin et al. | 47/1.01 R |
| 5,680,727 | * 10/1997 | Sakaue et al. | 47/1.01 R |
| 5,765,491 | 6/1998 | Brower et al. | 111/105 |
| 5,829,232 | 11/1998 | Takahashi | 53/499 |
| 5,842,306 | * 12/1998 | Onosaka et al. | 47/1.01 R |

FOREIGN PATENT DOCUMENTS

2693344 * 1/1994 (FR) .................................. 47/1.01 R

* cited by examiner

Primary Examiner—Peter M. Poon
Assistant Examiner—Son T. Nguyen
(74) Attorney, Agent, or Firm—Lyon, Harr and DeFrank; Richard Lyon; Mark Watson

(57) ABSTRACT

This invention relates to a system and method for automatically selecting viable seedlings or plants from a nursery tray for transplant into a field by an automatic transplant device. An automatic plant selector according to the present invention functions as an attachment to an automatic transplant device such as a rotary cup transplant machine. The plant selector eliminates the requirement of human labor while significantly reducing the percentage of non-viable or "blank" transplants when using an automatic transplant device to plant seedlings. This reduction is accomplished through use of primary and secondary nursery trays that are addressed by primary and secondary plant removal devices, or "plant pullers," respectively, which automatically provide viable seedlings to the automatic transplant device. The plant selector moves these nursery trays in horizontal and vertical increments that allow each cell in each tray to become available in turn to either the primary or secondary plant puller. The secondary plant puller is used to provide a viable seedling from the secondary nursery tray when a plant sensor indicates that the primary plant puller is unable to provide a viable seedling from the primary nursery tray.

25 Claims, 4 Drawing Sheets

AUTOMATIC PLANT SELECTOR

BACKGROUND OF THE INVENTION

1. Technical Field

This invention relates to an automatic plant selector that is adapted to minimize the transplant of non-viable seedlings.

2. Background Art

There are various problems associated with automatic transplant devices. Some of these problems are related to the configuration of the transplant device, while other problems are related to the manner in which seedlings are selected for transplant.

By way of background, a practice widely used in agriculture is that plants are grown in nursery trays to a height of 3 to 5 inches, at which point they are transplanted into a field where they are grown to maturity. Various transplant machines are available that will put a plant into the ground at the correct spacing, however, most of these machines require that a person be seated on the transplant machine to manually take one plant at a time from a nursery tray and place it into the transplant machine. Other machines are available which will automatically place plants into the transplant machine. However, these automatic plant selector machines are plagued with the problem of placing non-viable or "blank" seedlings into the transplant machine. The transplant of blanks into a field serves to significantly limit crop yields as the remaining viable seedlings grow to maturity. While using human labor to provide seedlings to a transplant machine can significantly reduce the incidence of blanks, the cost of such labor can be prohibitive.

Plant selectors used with automatic transplant devices use single nursery trays that are indexed, or moved in steps in the X-Y plane, such that cells in the tray become available, in turn, to a plant removal mechanism. The plant removal mechanism removes seedlings from the tray and provides them either singly, or in groups, to the automatic transplant device for transplanting into a field. Many of these devices ignore the presence of blank or non-viable cells. Other devices may use sensors to determine whether a viable seedling has been selected. Such devices may attempt to select an alternate seedling from the nursery tray to replace a non-viable seedling. However, indexing the tray to provide alternate seedlings to the plant removal device may require the transplant machine to slow or stop while an alternate is selected.

Therefore, in order to overcome the limitations of prior transplant devices, what is needed is a device that will eliminate the requirement of human labor by automatically providing seedlings to an automatic transplant device. In addition, this device should significantly limit the incidence of blank transplants by ensuring that the seedlings provided to the automatic transplant device are viable. Further, the selection of viable seedlings should not require the automatic transplant device to wait for an alternate seedling when the plant removal mechanism encounters a non-viable or blank cell in the nursery tray.

SUMMARY

An automatic plant selector according to the present invention satisfies all of the foregoing needs. The plant selector eliminates the requirement of human labor while significantly reducing the percentage of non-viable or "blank" transplants when using an automatic transplant device to plant seedlings. The reduction in blanks is accomplished by using a secondary nursery tray to supply a seedling when a plant sensor device indicates that a primary nursery tray can not supply a viable seedling. The nursery trays are comprised of multiple individual cells, each cell containing a single seedling. Because a secondary tray is used, an alternate seedling may be supplied to the automatic transplant device immediately upon detection of a blank cell in the primary tray.

The plant selector functions as an attachment to automatic transplant devices such as, for example, a rotary cup transplanter. A scaffold is attached to the top of the automatic transplant device to provide a framework for the components of the automatic plant selector. The plant selector has a primary and a secondary side, which are identical with one exception. The primary side has a plant sensor device that is used to determine whether an active cell in the primary nursery tray has a viable seedling. The secondary side does not use a plant sensor device.

Each side of the automatic plant selector has a full tray holder that holds multiple nursery trays of seedlings for transplant. The full tray holders are attached to a primary and a secondary track on the interior of the scaffold. The track allows the full tray holders to be moved in horizontal steps, i.e. "indexed." In addition, nursery trays that are held within the full tray holders are indexed in vertical steps. Indexing of the nursery trays is accomplished mechanically using computer and/or mechanical control of motors to move the primary and secondary tracks. As each track is indexed, the nursery tray that it holds is also indexed such that each cell in the nursery tray is exposed in turn to a primary or a secondary plant removal device, or "plant puller," for the primary or secondary nursery tray, respectively. The primary and secondary plant pullers are attached to the primary and secondary sides of the interior of the scaffold. The plant pullers for both the primary and secondary nursery trays are separate yet identical.

The secondary tray is initially indexed simultaneously with the primary tray such that an active cell in both the primary and secondary tray is available to the primary or secondary plant puller. The primary and secondary plant pullers are in continuous operation, and will attempt to remove a plant from a nursery tray whenever a tray is indexed. Once the primary tray has been indexed and is in position, the primary plant puller attempts to remove a seedling from the active cell in the primary nursery tray. The plant sensor associated with the primary plant puller indicates to a control mechanism whether a viable seedling was removed from the primary nursery tray by the primary plant puller. If the primary plant puller was successful in "pulling" a viable seedling from the tray, the seedling is released into the automatic transplant device where it is subsequently transplanted into the field. If the plant sensor indicates that the primary plant puller was unsuccessful, the secondary tray is indexed and the secondary plant puller removes an alternate seedling from the secondary tray. This alternate seedling is then supplied to the automatic transplant device where it is subsequently transplanted into the field. The primary tray is then indexed such that the next cell in the primary tray is in position for the primary plant puller. This process is repeated until the nursery tray is emptied by the plant puller. As nursery trays are emptied, they are automatically moved to a primary or secondary empty tray storage cage that is attached to the primary or secondary side of the exterior of the scaffold. As the empty tray is removed, it is automatically replaced with a full nursery tray from the primary or secondary full tray holder. Indexing and removal of seedlings from the replacement tray begins immediately.

DETAILED DESCRIPTION OF THE PREFERRED EMBODIMENTS

In the following description of the preferred embodiments of the present invention, reference is made to the accompanying drawings, which form a part hereof, and which are shown by way of illustration of specific embodiments in which the invention may be practiced. It is understood that other embodiments may be utilized and structural changes may be made without departing from the present scope of the invention.

Overview

Figure 1:
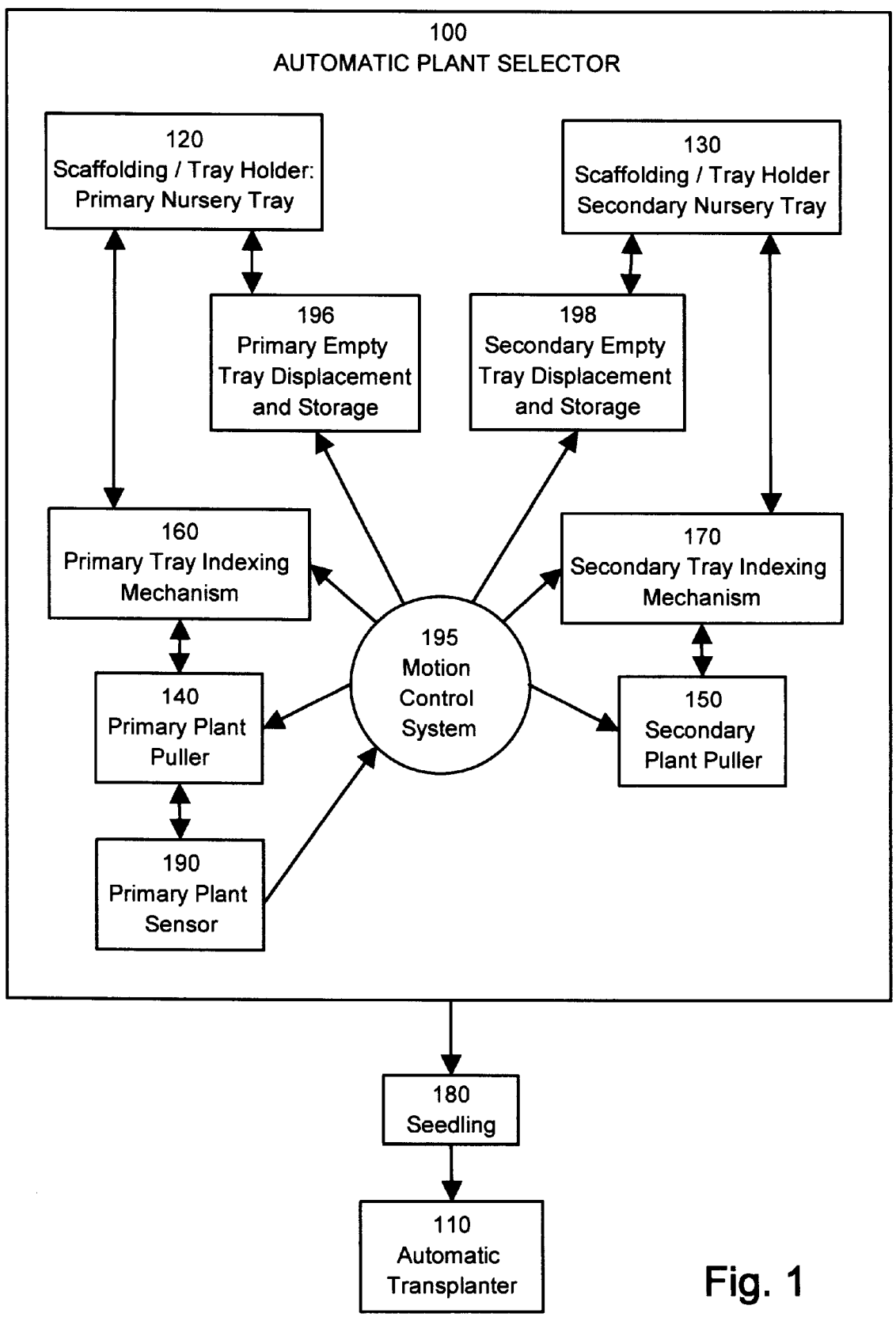
FIG. 1 is an architectural block diagram that illustrates the interconnections between the major elements of an automatic plant selector according to the present invention.

The system of FIG. 1 is an architectural block diagram that illustrates an automatic plant selector having a scaffold which supports a primary and secondary nursery tray holder, primary and secondary empty tray storage and displacement mechanisms, primary and secondary tray indexing mechanisms, primary and secondary plant removal mechanisms, a primary plant sensor, and a motion control system. These elements form a system which supplies a viable seedling or plant from a primary or secondary nursery tray to an automatic transplant device, such as, for example, the "Mechanical Transplanter Model 5000" rotary cup transplant machine. The automatic plant selector 100 reduces the percentage of blank transplants when using the automatic transplant device 110 to plant seedlings. The reduction in blanks is accomplished through use of a primary nursery tray in a primary tray holder 120, and a secondary nursery tray in a secondary tray holder 130. The nursery tray can comprise multiple rows and columns forming a matrix of individual cells, each cell preferably containing a viable seedling or plant. For the purpose of this disclosure, the term "blank" will mean an individual cell in a nursery tray that does not contain a viable seedling or plant. The tray holders are coupled to a scaffold that forms the body of the automatic plant selector 100. The primary and secondary nursery trays are addressed by primary 140 and secondary 150 plant removal devices, or "plant pullers," respectively, which are also coupled to the scaffold. The plant selector moves these nursery trays in horizontal and vertical increments that allow each cell in each tray to become available in turn to either the primary or secondary plant puller, 140 or 150. For the purpose of this disclosure, the term "active cell" is used to describe any cell in a nursery tray which is in a position wherein a seedling or plant in that cell can be removed by the automatic plant selector and placed into the automatic transplant device. Movement of the nursery trays is accomplished by primary 160 and secondary 170 tray indexing mechanisms which are coupled to the primary and secondary tray holders, respectively. The secondary plant puller 150 is used to provide a viable seedling 180 from the secondary nursery tray when a plant sensor 190, associated with the primary plant puller 140, indicates to a motion control system 195 that the primary puller is unable to provide a viable seedling from an active cell in the primary nursery tray. When all the cells in a nursery tray have been emptied by the primary or secondary plant puller, the empty tray is moved into a primary or secondary empty tray storage cage by a primary or secondary empty tray displacement mechanism, 196 or 198.

Components

Figure 2:
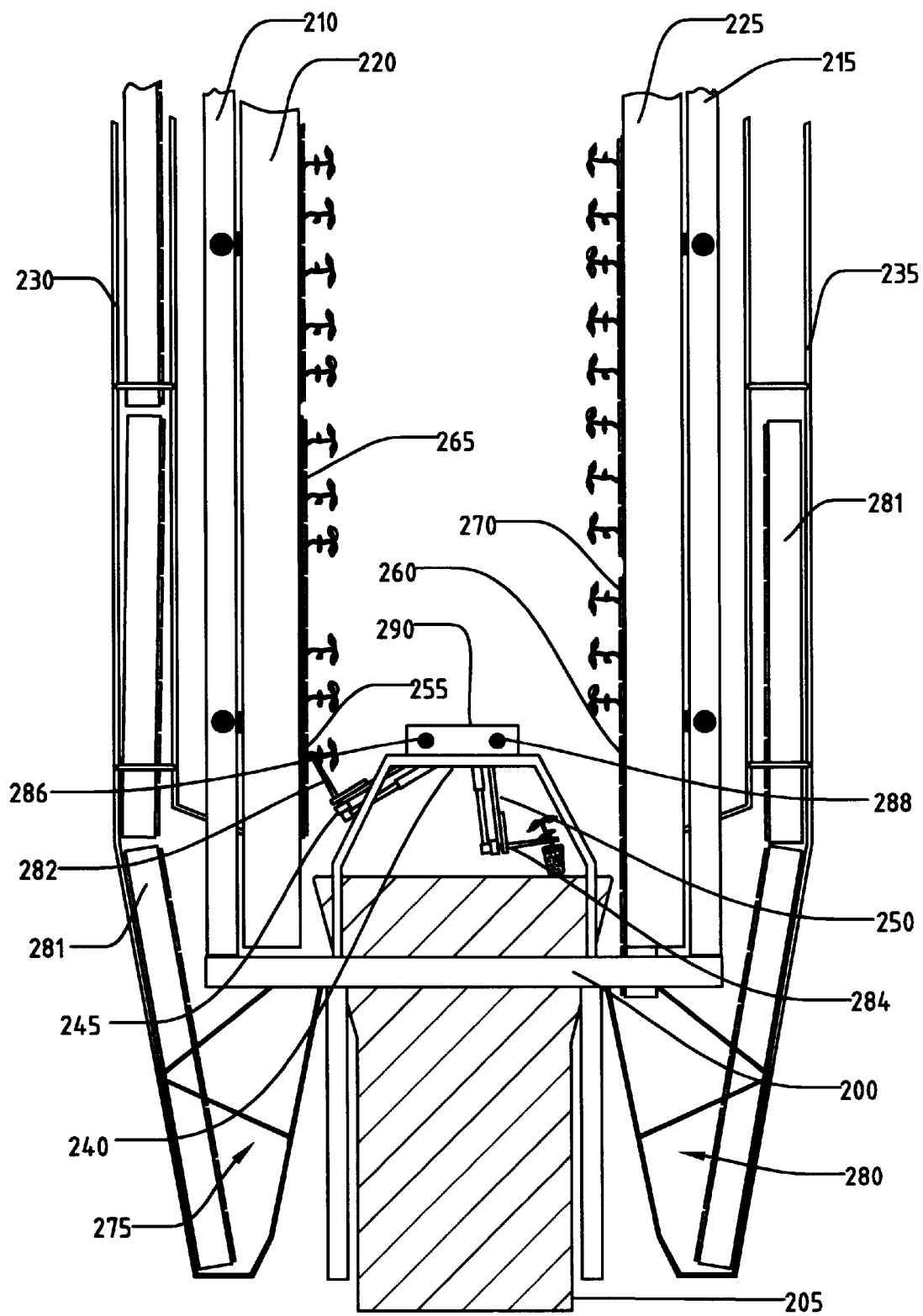
FIG. 2 is a schematic front elevation, partially broken away, of the automatic plant selector of FIG. 1, showing the use of a primary and a secondary nursery tray.

FIG. 2 illustrates the automatic plant selector having a scaffold 200 that is coupled to an automatic transplant device 205. The scaffold has a primary side 210 and a secondary side 215 that are positioned to either side of the top of the automatic transplant device 205. The secondary side 215 of the scaffold 200 is a mirror image of the primary side 210. A primary full tray holder 220 is movably coupled to a primary tray indexing mechanism (element 160 of FIG. 1), which is coupled to the interior of the primary side 210 of the scaffold 200. A secondary full tray holder 225 is movably coupled to a secondary tray indexing mechanism (element 170 of FIG. 1), which is coupled to interior of the secondary side 215 of the scaffold 200. The primary and secondary tray indexing mechanisms are controlled by a motion control system (element 195 of FIG. 1). A primary empty tray storage cage 230 is coupled to the exterior of the primary side 210 of the scaffold 200. A secondary empty tray storage cage 235 is coupled to the exterior of the secondary side 215 of the scaffold 200. A platform 240 is coupled to the base of the scaffold 200 above the top of the transplant machine 205. This platform 240 supports a primary plant puller 245, and a secondary plant puller 250, which are positioned to address an active cell 255 or 260 in a primary or secondary nursery tray 265 or 270 held in the primary or secondary full tray holders 220 or 225, respectively. At least one conventional "plant sensor" device (element 190 of FIG. 1) is associated with the primary plant puller 245. The plant sensor operates in conjunction with the primary plant puller 245 to determine whether the plant puller was successful in removing a plant from the active cell in the primary nursery tray 265.

The primary and secondary full tray holders 220 and 225 each hold multiple full nursery trays, i.e. nursery trays wherein the cells hold plants or seedlings. The full tray holders have vertical racks that hold nursery trays on their side as illustrated in FIG. 2. The primary tray holder 220 is movably coupled to the primary tray indexing mechanism. The secondary tray holder 225 is movably coupled to the secondary tray indexing mechanism.

The primary and secondary empty tray storage cages 230 and 235 each hold trays in which the seedlings have been expended by either the primary or secondary plant puller 245 or 250. As nursery trays are emptied in either the primary or secondary full tray holders 220 or 225, the primary or secondary tray indexing mechanism drops these trays into a primary or secondary catch basin 275 or 280 in the primary or secondary empty tray storage cage 230 or 235. As an empty tray enters the catch basin, it is moved up and into the empty tray storage cage by an actuator such as a hydraulic or pneumatic lift or an electric or gas powered motor which drives a primary and a secondary empty tray displacement mechanism (elements 196 and 198 of FIG. 1) to make room for the next empty nursery tray 281.

The primary and secondary tray indexing mechanisms move the primary 220 and secondary 225 tray holders, respectively, horizontally in predefined increments equivalent to the width of individual cells in the nursery trays. Further, the tray indexing mechanisms also move the nursery trays vertically within the full tray holders in predefined increments equivalent to the height of individual cells in the nursery trays. Consequently, both the primary and secondary nursery trays 265 and 270 may be indexed horizontally and vertically such that an active cell in each tray is presented in turn to either the primary or secondary plant puller 245 or 250, respectively. The primary and secondary tray indexing mechanisms are preferably controlled via a motion control computer and/or a mechanical control system using conventional methods to control actuators, such as, for example, hydraulic or pneumatic actuators or gas or electric powered motors, which drive the primary and secondary tray indexing mechanisms.

Figure 3:
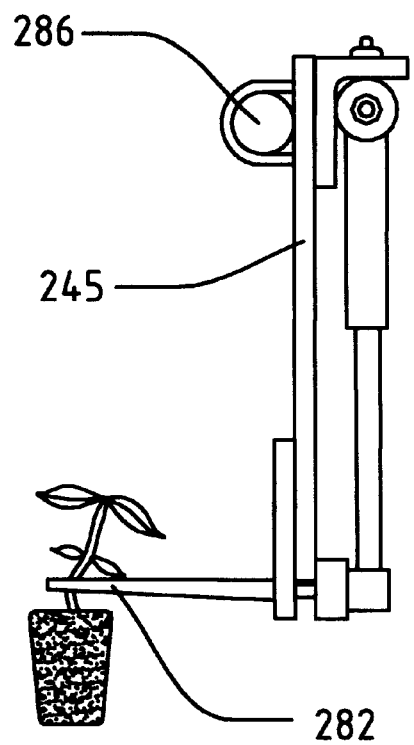
FIG. 3 is a schematic side elevation of the plant puller of FIG. 2 holding a seedling prior to release into an automatic transplant device.
Figure 4:
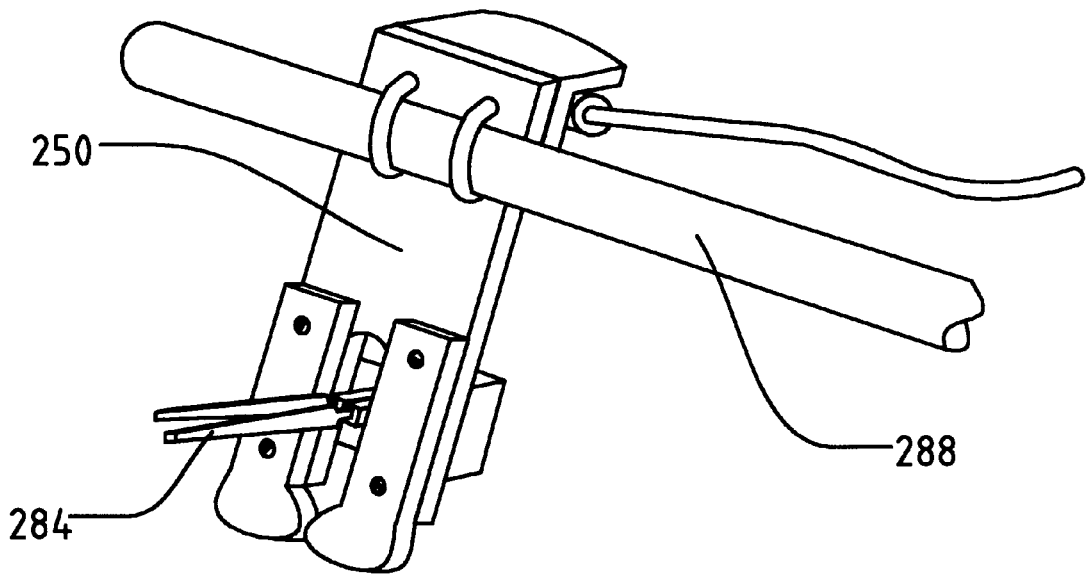
FIG. 4 is a partial perspective view of the plant puller mechanism of FIG. 3.

FIG. 2 illustrates the preferred primary and secondary plant pullers 245 and 250, coupled to the platform 240. FIG. 3 illustrates the plant puller holding a seedling in a default position prior to releasing it into the automatic transplant device 205. FIG. 4 is a partial perspective view of the plant puller. These plant pullers preferably have pneumatically controlled "tweezers" 282 or 284 that grip the stem of a seedling to pull the seedling from the active cell in the nursery tray. However, these tweezers can also be controlled by other methods such as, for example, a mechanically operated cam, a gear driven timing chain or belt, an AC or DC electric motor using battery or solar power, a gas motor, a vacuum solenoid, or a hydraulic or spring driven actuator. The primary plant puller 245 is rotatably mounted on a primary shaft 286. The secondary plant puller 250 is rotatably mounted on a secondary shaft 288. These shafts are preferably rotatably coupled to a polymer block 290 which is in turn coupled to the platform 240 above the automatic transplant device 205. Alternatively, the primary and secondary shafts 286 and 288 may be rotatably coupled to a pair of primary bearings or a pair of secondary bearings that are in turn coupled to the platform 240 above the automatic transplant device 205. The primary plant puller 245 is positioned on the platform 240 such that it can access the seedling in the active cell in the primary nursery tray as indexing brings that cell into position. Similarly, the secondary plant puller 250 is positioned on the platform 240 such that it can access the seedling in the active cell in the secondary nursery tray as indexing brings that cell into position.

The primary and secondary plant pullers, 245 and 250, are controlled by a mechanical motion control system which uses a series of gears and timing chains to operate the plant pullers continuously in synchronicity with the automatic transplant device 205. However, other methods of motion control, such as, for example, electrical, hydraulic or pneumatic actuators, or computer-controlled electric motors, may also be used to control the plant pullers 245 and 250. The motion control system rotates the plant pullers 245 and 250 through approximately 90 degrees from the default state to a position relative to the active cell. When the tweezers of the plant puller are in position, the tweezers of the plant puller close around the stem of the plant or seedling in the active cell. The plant puller is then rotated back to the default position, pulling the seedling from the active cell. Once back in the default position, the plant puller releases the plant or seedling, which then drops into the automatic transplant device 205.

A plant sensor device associated with the primary plant puller 245, preferably has at least one sensor. The plant sensor device is used to determine whether a viable plant is pulled from the active cell by the primary plant puller. Various types of sensors may be used, such as, for example, a detector that uses visible light to optically scan the active cell in the nursery tray, an infrared detector, an ultrasonic detector, or a capacitance detector which determines whether the primary plant puller has gripped a viable seedling. The sensor device is preferably used with the primary plant puller, and is not considered necessary for the secondary plant puller as blanks in the secondary nursery tray may be considered an acceptable "loss". This loss produces an average rate of blank transplants that may be approximated by calculating the square of the average percentage of blanks per nursery tray. For example, if the average percentage of blanks were 15% per tray, then the percentage of blanks supplied to the automatic transplant device would be equal to the square of 15%, or 2.25%.

Other Embodiments

In another embodiment of an automatic plant selector according to the present invention, a tertiary full tray holder mechanism with associated motion control and plant puller mechanisms may be used to further reduce the possibility of blanks. In such a case, the secondary plant removal device would use a plant sensor device similar to that described above for the primary plant puller. When both the primary and secondary plant sensors indicate the presence of blanks in the active cells of both the primary and secondary nursery trays, the tertiary nursery tray is addressed to supply an alternate seedling to the automatic transplant device. In this embodiment, blanks in the tertiary nursery tray are considered an acceptable "loss". The loss in this embodiment may be approximated by calculating the cube of the average percentage of blanks per nursery tray. For example, if the average percentage of blanks is again assumed to be 15% per tray, then the percentage of blanks supplied by this embodiment of the automatic plant selector would be equal to the cube of 15%, or 0.34%. Further reductions in the average blank rate may be achieved by adding additional tray holder mechanisms, plant sensors, and plant removal devices as described above for a system using a tertiary tray.

In a further embodiment of a plant selector according to the present invention, the plant removal mechanisms of the previous embodiment may be replaced with a primary and secondary push rod mechanism. The push rod mechanisms may be mounted behind both the primary and secondary full tray holders to "push" a seedling from the active cell so that it drops into the automatic transplant device. As with the previous embodiment, a plant sensor device determines whether a viable plant is available to the primary push rod mechanism, then directs the secondary push rod mechanism accordingly.

Operation

Figure 5:
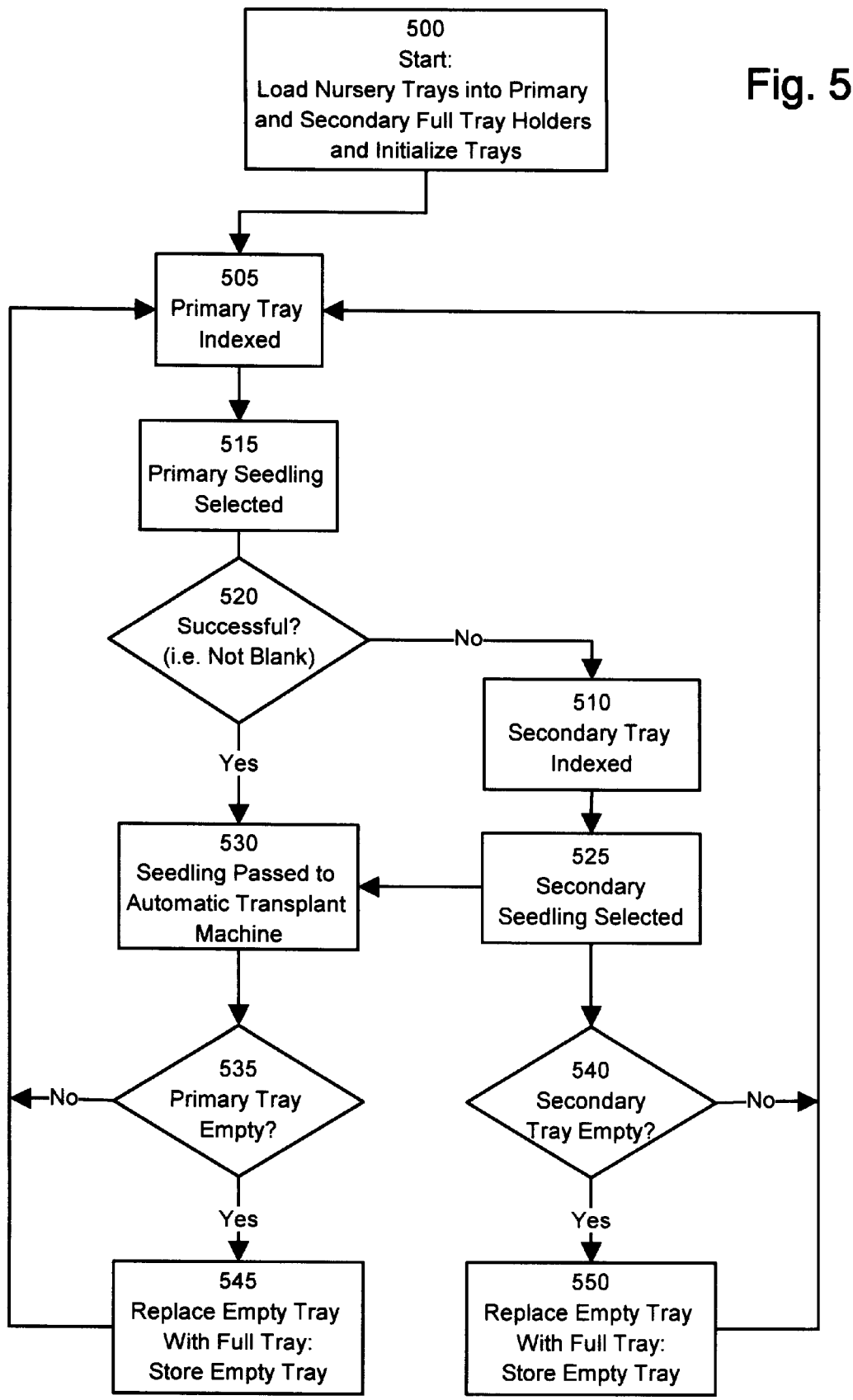
FIG. 5 is a general operational block diagram of the automatic plant selector of FIG. 1.

The sequence and method of operations is illustrated in the operational block diagram of FIG. 5. Operation is started by loading several full trays of seedlings or plants into the primary and secondary full tray holders (Box 500 of FIG. 5). The primary and secondary nursery trays are initialized by the primary or secondary tray indexing mechanisms such that both the primary and secondary nursery trays are located with the first active cell in position to be addressed by the primary or secondary plant puller. Because the plant pullers operate continuously in synchronicity with the automatic transplant device, as described above, the initial active cell in the primary and secondary nursery trays may be intentionally empty so that seedlings are not selected until required. Sequential indexing of the nursery trays ensures that each cell in each tray becomes available in turn to either the primary or secondary plant puller (Box 505 or Box 510, respectively).

The primary plant puller attempts to remove a seedling from the active cell in the primary tray, and to position that seedling above the automatic transplant device (Box 515).

However, when the plant sensor indicates that the active cell in the primary tray is blank, or that the primary plant puller failed to remove a viable seedling from the primary tray (Box 520), the secondary tray is indexed (Box 510) and the secondary plant puller removes an alternate seedling from the secondary tray and positions it above the automatic transplant device (Box 525). As soon as a seedling is positioned over the automatic transplant device, by either the primary or secondary plant puller, it is released into the automatic transplant device where it is subsequently transplanted into the field (Box 530).

As soon as the plants or seedlings in a nursery tray have been exhausted (Box 535 or 540), the empty tray is automatically moved to the primary or secondary empty tray storage cage and replaced with a full tray from the full tray holder (Box 545 or 550). The cycle of tray indexing and plant removal is repeated until all nursery trays in either the primary or secondary tray holder have been exhausted, at which point the empty full tray holder is reloaded with full nursery trays (Box 500). Further, it is also possible to reload the full tray holders while the automatic plant selector is in operation. This avoids the necessity to pause or halt the automatic transplant device during operation.

While the invention has been described in detail by specific reference to preferred embodiments thereof, it is understood that variations and modifications thereof may be made without departing from the true spirit and scope of the invention. For example, this invention can also be adapted to serve various types of automatic transplant devices other than rotary cup transplanters.

Wherefore, having thus described the present invention, what is claimed is:

1. An automatic plant selector apparatus having:
   a scaffold,
   a primary nursery tray holder for holding at least one primary nursery tray, wherein the primary nursery tray holder is movably coupled to a primary side of the scaffold,
   a secondary nursery tray holder for holding at least one secondary nursery tray, wherein the secondary nursery tray holder is movably coupled to a secondary side of the scaffold,
   a primary plant removal mechanism moveably coupled to the scaffold for removing plants from the at least one primary nursery tray, and
   a secondary plant removal mechanism moveably coupled to the scaffold for removing plants from the at least one secondary nursery tray when a plant is not available to the primary plant removal mechanism.

2. The automatic plant selector of claim 1 wherein each primary nursery tray is comprised of cells filled with plants.

3. The automatic plant selector of claim 2 wherein the primary nursery tray holder is movably coupled to a primary tray indexing mechanism that is further coupled to the primary side of the scaffold.

4. The automatic plant selector of claim 3 wherein the primary tray indexing mechanism is capable of horizontally and vertically indexing the primary nursery tray.

5. The automatic plant selector of claim 4 wherein indexing of the primary nursery tray individually exposes each cell in the primary nursery tray to a primary plant removal mechanism which is rotatably coupled to the primary side of the scaffold.

6. The automatic plant selector of claim 1 wherein each primary nursery tray is comprised of cells filled with plants.

7. The automatic plant selector of claim 6 wherein the secondary nursery tray holder is movably coupled to a secondary tray indexing mechanism that is further coupled to the secondary side of the scaffold.

8. The automatic plant selector of claim 7 wherein the secondary tray indexing mechanism is capable of horizontally and vertically indexing the secondary nursery tray.

9. The automatic plant selector of claim 8 wherein indexing of the secondary nursery tray individually exposes each cell in the secondary nursery tray to a secondary plant removal mechanism which is rotatably coupled to the secondary side of the scaffold.

10. The automatic plant selector of claim 1 wherein the primary plant removal mechanism is capable of removing a seedling from an active cell in the primary nurse tray.

11. The automatic plant selector of claim 10 wherein the primary plant removal mechanism is capable of depositing the seedling into an automatic transplant device.

12. The automatic plant selector of claim 10 further comprising at least one plant sensor which is coupled to the primary plant removal mechanism, and which is capable of determining whether the active cell in the primary nursery tray is blank.

13. The automatic plant selector of claim 12 wherein the secondary plant removal mechanism, operates to remove a plant from the at least one secondary nursery tray when the active cell in the primary nursery tray is blank.

14. The automatic plant selector of claim 1 wherein the secondary plant removal mechanism, of capable of removing a seedling from an active cell in the secondary nursery tray.

15. The automatic plant selector of claim 14 wherein the secondary plant removal mechanism is capable of depositing the seedling into an automatic transplant device.

16. The automatic plant selector of claim 1 further comprising a primary empty tray storage cage coupled to the exterior of the primary side of the scaffold.

17. The automatic plant selector of claim 16 wherein empty nursery trays are automatically moved into and stored in the primary empty tray storage cage after the seedlings in the individual cells in the primary nursery tray have been removed by the primary plant removal mechanism.

18. The automatic plant selector of claim 1 further comprising a secondary empty tray storage cage coupled to the exterior of the secondary side of the scaffold.

19. The automatic plant selector of claim 18 wherein empty nursery trays are automatically moved into and stored in the secondary empty tray storage cage after the seedlings in the individual cells in the secondary nursery tray have been removed by the secondary plant removal mechanism.

20. An automatic plant selector apparatus for reducing the selection of non-viable seedlings comprising:
    at least two nursery tray holders, each holding at least one nursery tray, movably coupled to a scaffold;
    at least two plant removal devices movably coupled to the scaffold, wherein each plant removal device is associated with a separate nursery tray holder; and
    wherein at least one subsequent nursery tray holder is addressed by the plant removal device associated with the subsequent nursery tray holder when the plant selector apparatus is unable to remove a viable seedling from at least one prior nursery tray.

21. The plant selector of claim 20 wherein each plant removal device is positioned to address a separate nursery tray.

22. The plant selector of claim 21 wherein each of the plant removal devices are capable of removing seedlings from nursery trays held by the nursery tray holders.

23. The plant removal device of claim 22 further comprising at least one plant sensor coupled to scaffold.

24. The plant selector of claim 23 wherein at least one subsequent nursery tray is addressed by a plant removal device when the at least one plant sensor detects that a viable seedling was not removed from at least one prior nursery tray.

25. The plant selector of claim 23 wherein at least one subsequent nursery tray holder is addressed by a plant removal device when the at least one plant sensor indicates to a control mechanism that at least one plant removal device was unable to remove a viable seedling from at least one prior nursery tray holder.

* * * * *